(12) United States Patent
Villatel et al.

(10) Patent No.: US 10,803,176 B2
(45) Date of Patent: Oct. 13, 2020

(54) BIOS SECURITY

(71) Applicant: HEWLETT-PACKARD DEVELOPMENT COMPANY, L.P., Houston, TX (US)

(72) Inventors: Maugan Villatel, Bristol (GB); Boris Balacheff, Boulogne-Billancourt (FR); David Plaquin, Bristol (GB); Vali Ali, Houston, TX (US); Jeffrey Kevin Jeansonne, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 115 days.

(21) Appl. No.: 16/083,818

(22) PCT Filed: Oct. 21, 2016

(86) PCT No.: PCT/US2016/058047
§ 371 (c)(1),
(2) Date: Sep. 10, 2018

(87) PCT Pub. No.: WO2018/075057
PCT Pub. Date: Apr. 26, 2018

(65) Prior Publication Data
US 2019/0087582 A1    Mar. 21, 2019

(51) Int. Cl.
*G06F 9/00* (2006.01)
*G06F 21/57* (2013.01)
*G06F 9/4401* (2018.01)

(52) U.S. Cl.
CPC .......... *G06F 21/575* (2013.01); *G06F 21/572* (2013.01); *G06F 9/4401* (2013.01)

(58) Field of Classification Search
CPC .............................. G06F 21/575; G06F 21/572
USPC ............................................................ 713/2
See application file for complete search history.

(56) References Cited

U.S. PATENT DOCUMENTS

| | | | | |
|---|---|---|---|---|
| 7,143,275 | B2 * | 11/2006 | Cepulis | G06F 11/1417 713/1 |
| 7,293,169 | B1 | 11/2007 | Righi et al. | |
| 8,296,579 | B2 | 10/2012 | Piwonka et al. | |
| 8,904,162 | B2 | 12/2014 | Futral et al. | |
| 9,026,771 | B2 * | 5/2015 | Ibrahim | G06F 21/57 709/219 |

(Continued)

OTHER PUBLICATIONS

Yao et al., "A Tour Beyond BIOS Implementing UEFI Authenticated Variables in SMM with EDKII", Intel, Retrieved from Internet: http://download2.nust.na/pub4/sourceforge/e/ed/edk2/General%20Documentation/A_Tour_Beyond_BIOS_Implementing_UEFI_Authenticated_Variables_in_SMM_with_EDKII_V2.pdf, Sep. 2015, 39 pages.

(Continued)

*Primary Examiner* — Volvick Derose
(74) *Attorney, Agent, or Firm* — HPI Patent Department

(57) ABSTRACT

Examples associated with basic input/output system (BiOS) security are described. One example includes detecting a mismatch between an active BiOS setting and a saved BIOS setting. An update previously applied to the active BiOS setting is validated. The update Is applied to the saved BIOS setting creating an updated BIOS setting. The saved BIOS setting is updated when the updated BIOS setting and the active BIOS setting match. The saved BIOS setting is updated to the active BIOS setting. A security action is taken when the updated BiOS setting and the active BiOS setting differ.

13 Claims, 6 Drawing Sheets

(56) References Cited

U.S. PATENT DOCUMENTS

| | | | |
|---|---|---|---|
| 9,372,699 B2 | 6/2016 | Bobzin | |
| 2011/0113181 A1* | 5/2011 | Piwonka | G06F 8/65 |
| | | | 711/102 |
| 2012/0260082 A1* | 10/2012 | Bobzin | G06F 21/572 |
| | | | 713/100 |
| 2013/0151848 A1 | 6/2013 | Baumann et al. | |
| 2014/0040605 A1* | 2/2014 | Futral | G06F 9/445 |
| | | | 713/2 |
| 2014/0189336 A1* | 7/2014 | Ballesteros | G06F 21/575 |
| | | | 713/2 |
| 2015/0089209 A1* | 3/2015 | Jacobs | G06F 21/575 |
| | | | 713/1 |
| 2015/0089238 A1* | 3/2015 | Lewis | H04L 9/0891 |
| | | | 713/183 |
| 2015/0205616 A1* | 7/2015 | Thai | G06F 9/4401 |
| | | | 345/542 |
| 2015/0222604 A1 | 8/2015 | Ylonen | |
| 2015/0378846 A1 | 12/2015 | Hagiwara et al. | |
| 2015/0379306 A1* | 12/2015 | Zimmer | G06F 21/72 |
| | | | 713/193 |
| 2016/0162285 A1* | 6/2016 | Gilbert | G06F 21/575 |
| | | | 717/170 |

OTHER PUBLICATIONS

Bahsun et al., "Too Young to Be Secure: Analysis of UEFI Threats and Vulnerabilities", Proceeding of the 14th Conference of Fruct Association, Retrieved from Internet: https://fruct.org/publications/fruct14/files/Bas_49.pdf, Nov. 11-15, 2013, 9 pages.

Zhengliu Zhou et al. Adavance and Development of Computer Firmware Security Research URL: http://www.academypublisher.com/proc/isip09/papers/isip09p258.pdf pp. 261; figure 2.

* cited by examiner

BIOS SECURITY

BACKGROUND

The basic input/output system (BIOS) is firmware used by a system (e.g., computer) when booting to initialize various hardware interfaces, and to provide a variety of services to the system while the system is operating. One BIOS standard is known as the unified extensible firmware interface (UEFI), which is used in many personal computers. The UEFI specifies several boot variables which may be updated while the system is operating to adjust how the BIOS operates. Some of these variables are defined as authenticated variables, and are used to aid in preventing malicious attacks on the BIOS and the system itself.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with basic input/output system (BIOS) security are described. System BIOSs store configuration settings in flash memory dedicated to the BIOS. Some of these settings are security sensitive and are managed by BIOS code running in system management mode (SMM). As malicious attacks on the SMM have increased, these security sensitive settings may be exposed, potentially allowing an attacker to defeat the security function of the SMM. This may enabling further compromise of, for example, the BIOS and the system with the compromised BIOS.

To protect these settings, a BIOS may be configured to store two sets of sensitive variables in a BIOS flash memory: an active version and a saved version. The BIOS flash memory may also store an ordered list of updates made to the variables since the prior boot. Further, a description of the saved version may be stored in a secure flash. Depending on resources available in the secure flash, the description may be a copy of the saved variables, a hash of the saved variables, and so forth. When the variables are loaded during a system boot, the active version may be compared to the description in the secure flash. If the two match, then no changes to the active version were made while the system was last operating, and the boot may proceed as normal.

If there are differences, updates from the ordered list may be verified and applied to the saved version to create an updated version of the sensitive variables. If the updated version matches the active version, then the changes made to the active version during prior system operation were authorized, and as above, the system may boot as normal. However, if the updated version does not match the active version, or one of the updates fails, then at least one of the saved version, active version, and updates may have been corrupted either incidentally or by a malicious attack. This may cause the BIOS to take an action to, for example, recover to a prior known safe state, alert a user of the system operating the BIOS, or take some other action consistent with reasserting control over the system and/or preventing similar attacks from occurring in the future.

Figure 1:
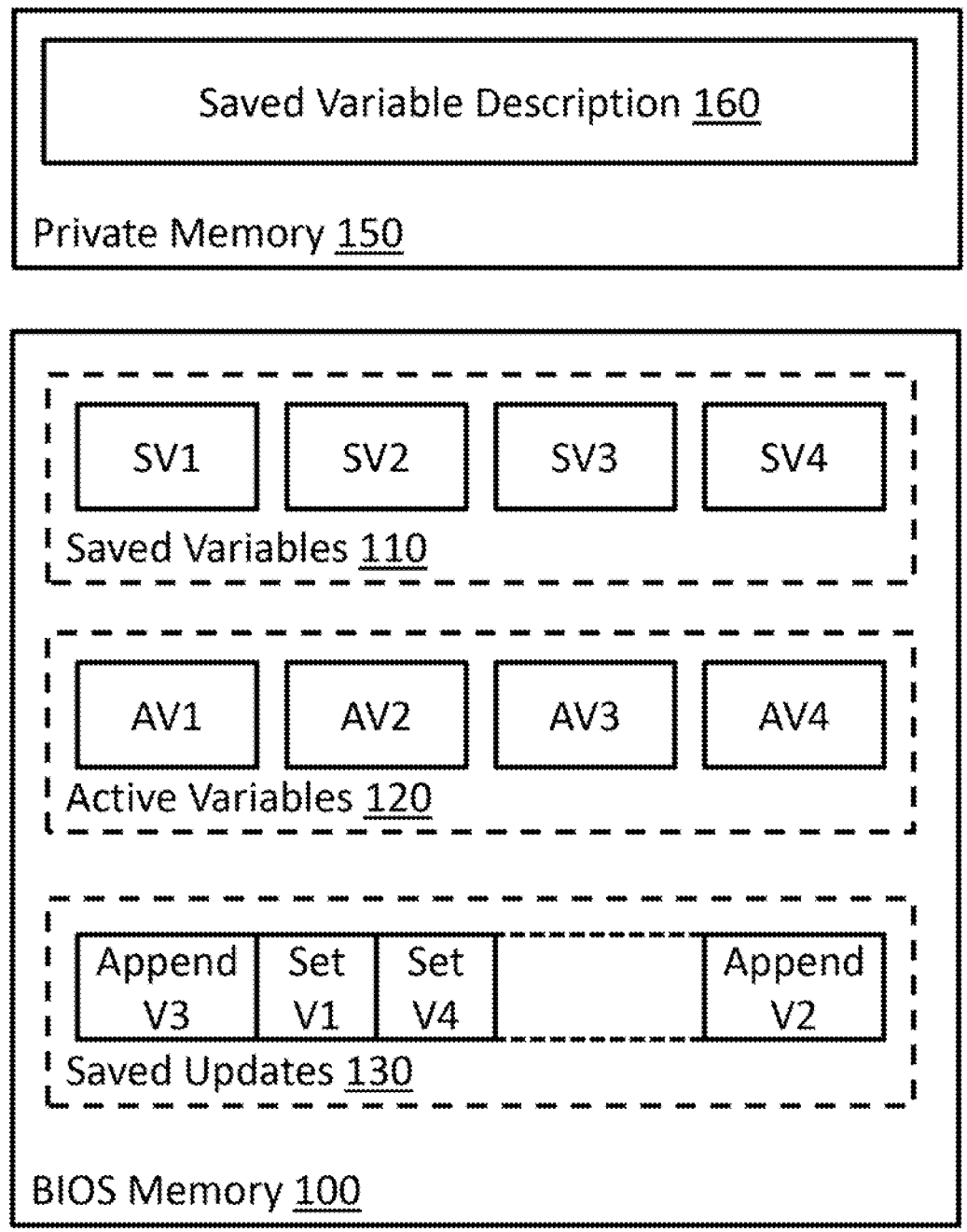
FIG. 1 illustrates example memories associated with BIOS security.

FIG. 1 illustrates example memories associated with basic input/output system (BIOS) security. It should be appreciated that the items depicted in FIG. 1 are illustrative examples, and many different systems, devices, and so forth, may operate in accordance with various examples.

FIG. 1 illustrates a BIOS memory 100. BIOS memory 100 may be, for example, a flash memory used by the BIOS of a system to store settings, instructions, and so forth associated with running a BIOS. The system may rely on the BIOS to, for example, perform various functions associated with starting or booting the system, as well as while the system is operating. These functions may include, for example, loading an operating system, detecting system components, interfacing system components with one another, and so forth.

When performing these functions, the BIOS may rely on a variety of settings and/or variables stored in BIOS memory 100. Some of these settings may be, for example, security sensitive blacklists, whitelists, and so forth. By way of illustration, the unified extensible firmware interface (UEFI) standard specifies a platform key (PK), a key exchange key (KEK), a forbidden signatures database (DBX), a signature database (DB), a timestamp signature database (DBT), and so forth, that the UEFI standard describes as authenticated variables. These authenticated variables, if compromised, could prevent a system from operating, allow operation of malicious code, and so forth. Thus, the authenticated variables are protected by being managed by BIOS code operating in system management mode (SMM), a privileged mode of execution. However, even the SMM has come under attack.

Consequently, to protect security sensitive BIOS variables, it may be desirable to determine if they have been maliciously manipulated, and if resources are available, restore them to a prior safe state. In various examples, this may be achieved in part by storing two copies of sensitive BIOS variables in BIOS memory 100. Here, these are illustrated as saved variables 110 and active variables 120. In this example, four sensitive BIOS variables are illustrated as saved variables 110 SV1 through SV4, and respective active variables 120 AV1 through AV4. However, in different examples, a greater or smaller number of sensitive BIOS variables may be used.

When a system running the BIOS is booted, the system will first check to see whether active variables 120 have changed since the last time the system as operated. While it is possible that this may be detected merely by comparing active variables 120 and saved variables 110, it is possible that both saved variables 110 and active variables 120 were maliciously updated to attempt to evade this type of detection. To protect against this, a saved variable description 160 may be stored in a private memory 150 separate from the BIOS memory 100. Private memory 150 may be controlled by a secure entity tasked with preventing the BIOS from becoming compromised. In various examples the saved variable description 160 may be a copy of the saved variables 110, a hash of the saved variables 110, and so forth. The form saved variable description 160 takes within private memory 150 may depend on system resources available for storing saved variable description 160, as well as restore functions desired in the event a mismatch is detected.

If no differences between active variables 120 and saved variable description 160 were detected, then the system may continue booting as normal as no malicious attack on the sensitive variables was made. If differences were detected, then it is desirable to first determine whether the differences were the result of an authorized modification or a malicious attack before taking security measures. This may be achieved by attempting to recreate active variables 120 using the saved variables 110 and a set of saved updates 130 to the sensitive variables. Saved updates 130 may be an ordered list of updates to the sensitive variables that were made during the prior operation of the system. Thus, to recreate active variables 120 from saved variables 110, saved updates 130 may be revalidated and applied to saved variables 110 in the order the saved updates were listed. This may create a set of updated variables (not shown). The updated variables may then be compared to the active variables 120. If the updated variables match the active variables, then no attacks on the sensitive variables were made, whether by manipulating saved variables 110, active variables 120, saved updates 130, or a combination thereof.

Notably, when active variables 120 are validated by comparing them to the updated variables during the boot of the system, this indicates that this set of active variable is a safe set of active variables to continue using in the future. Consequently, the saved variables 110 may also be updated to match the active variables 120, and the saved variable description 160 may be updated to correspond to the new saved variables 110. The saved updates queue 130 may also be cleared as the updates have been applied.

When a mismatch between the updated variables and active variables 120 exists after applying saved updates 130 to saved variables 110, this indicates a malicious attack on the sensitive variables. At this point, a security action may be taken to attempt to repair the saved variables and/or to notify an entity interested in security of the system. The scale of the security action taken may depend on what form the description of saved variables 160 takes in the private memory 150. If the description of the saved variables 160 is a copy of saved variables 110, it may be possible to restore saved variables and/or active variables 120 to a known secure state. If less information is available regarding the sensitive variables, for example, if saved variable description 160 stores a hash of saved variables 110, a recovery action may not be possible. In these scenarios, the system may be booted using the current settings, a known safe set of settings, and so forth, and an entity interested in the security of the system may be notified. The entity may be, for example, a user and/or administrator of the system, a remote logic that maintains the system, and so forth.

As discussed, the scope of information stored description of the saved variables 160 may depend on resources available in private memory 150, and the desirability of stronger system restoration options. By way of illustration, the UEFI authenticated variables include whitelists and blacklists, which may grow in size over time. If the amount of space available to store description of saved variables 160 is limited on private memory 150, due to, for example, multiple demands on a limited resource, the BIOS may rely on a weaker recovery option to protect the system.

After a successful boot of a system where no malicious action was detected, saved variables 110 and active variables 120 will match (e.g., SV1 will have the same value as AV1). This may be because no changes were made during a prior operation of the system, or because saved variables 110 were updated to match active variables 120. During operation of the system, various changes may be made to the sensitive variables. These changes may be authorized or unauthorized, depending on whether the changes are made through the proper channels with the proper authenticating information. This authenticating information may be system specific and depend on the type of BIOS used. As authorized changes are completed, the changes are made to active variables 120, with saved variables 110 maintaining their state throughout operation of the system. The authorized changes may also be logged in saved updates queue 130 for use the next time the system is started. These changes may be stored in order to ensure that active variables 120 can be reproduced from saved variables 110 at a future point of time.

In examples where saved variable description 160 stores a copy of saved variables 110, it may be possible to omit saved variables 110 from BIOS memory 100, and treat saved variable description 160 as saved variables 110. In this example, active variables 120 could be compared directly to saved variable description 160, and saved updates 130 could be applied to a copy of saved variable description 160 loaded into memory to generate the updated copy. Further, when saved variable description 160 includes a copy of saved variables 110, saved variable description 160 may also include a hash of saved variables 110 to speed up an initial comparison of active variables 120 and saved variables 110.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
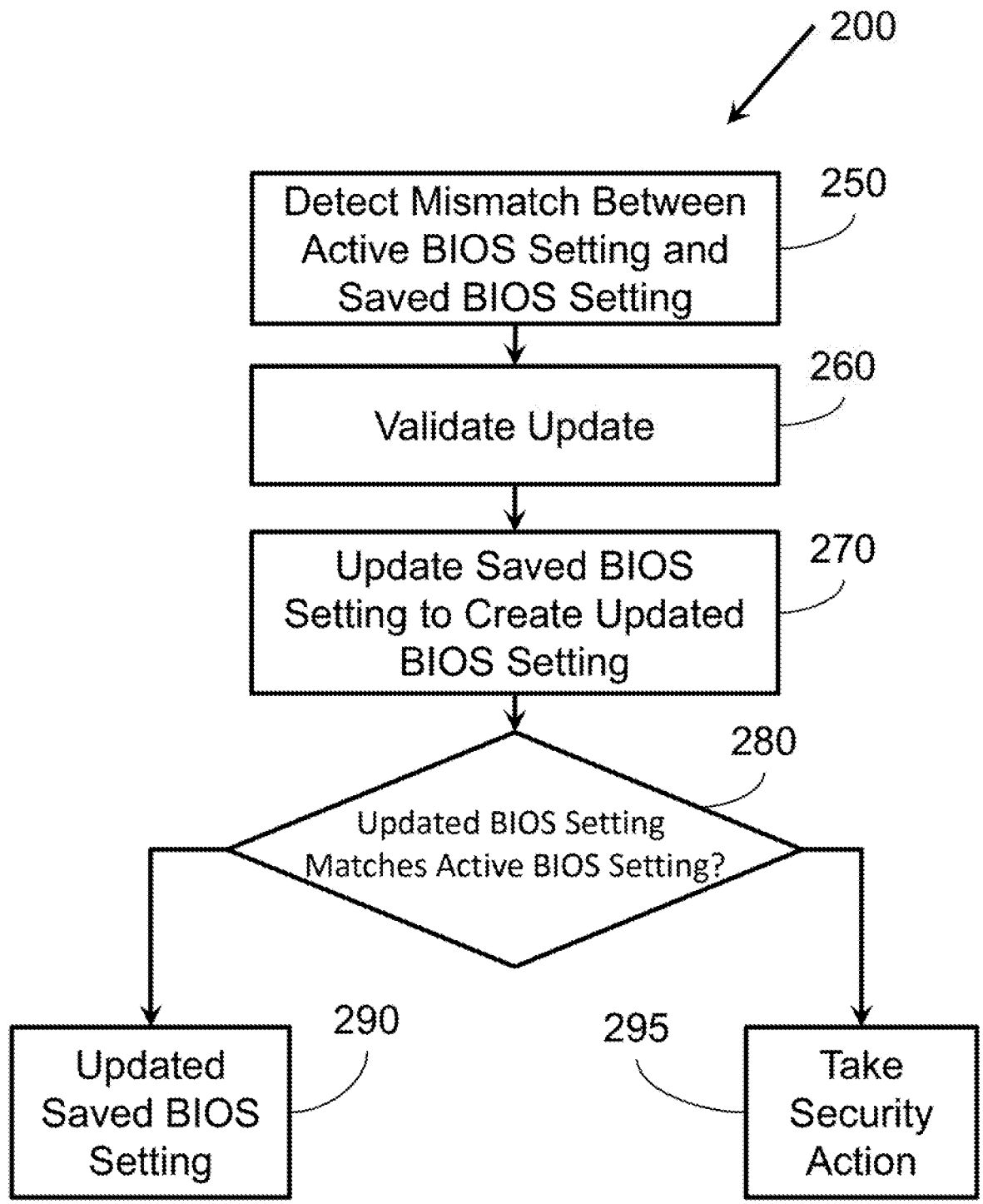
FIG. 2 illustrates a flowchart of example operations associated with BIOS security.

FIG. 2 illustrates an example method 200 associated with basic input/output system (BIOS) security. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC). In some examples, method 200 may be performed after system management mode (SMM) BIOS code has been loaded into the SMM BIOS area but before non-BIOS code has been run on the CPU. This may ensure that method 200 is operating in a secure environment with a low risk of the SMM itself being compromised, and assumes that the SMM could be compromised by the time the operating system starts running.

Method 200 includes detecting a mismatch between an active BIOS setting and a saved BIOS setting at 250. In various examples, the active BIOS setting and saved BIOS setting may be BIOS variables used by a BIOS during boot of a system or device in which the BIOS is installed. As discussed above, the BIOS may operate using the unified extensible firmware interface (UEFI) standard. Consequently, the BIOS setting may be a UEFI variable. Further the UEFI variable may be a UEFI authenticated variable as described in the UEFI standard.

In one example, detecting the mismatch between the active BIOS setting and the saved BIOS setting may include comparing a hash of the active BIOS setting to a hash of the saved BIOS setting. The hash of the saved BIOS setting may be stored in a secure memory. In another example, detecting the mismatch between the active BIOS setting and the saved BIOS setting may include comparing a hash of a set of active BIOS settings to a hash of saved BIOS settings. The hash of saved BIOS settings may be stored on the secure memory. In this example, the set of active BIOS settings may include the active BIOS setting and the set of saved BIOS settings may include the saved BIOS setting. Detecting the mismatch between the active BIOS setting and the saved BIOS setting may also include comparing the active BIOS setting and a copy of the saved BIOS setting that is stored in a secure memory.

Method 200 also includes validating an update at 260. The update may have been previously applied to the active BIOS setting. By way of illustration, during a previous operation of a system performing method 200, the system may have received an update to the active BIOS setting. This update may have been validated, applied to the active BIOS setting, and then logged so that the change could be reproduced to, for example, ensure the ability to recreate the active BIOS setting when determining whether there has been a malicious attack against the system. Updates may be validated depending on the type of variable being updated. Some variables may rely on, for example, a key hierarchy involving a valid digital signature, knowledge of a shared secret, and so forth.

Method 200 also includes applying the update to the saved BIOS setting at 270. This may create an updated BIOS setting. By way of illustration a series of updates may have been stored during a previous operation of a system performing method 200. At action 270, these updates may be sequentially validated and applied to the saved BIOS setting to recreate the updated BIOS setting. Reapplying them in the same order that they were previously applied may ensure accurate recreation of the active BIOS setting, assuming no malicious activity occurred manipulating one or more of the saved BIOS setting, the active BIOS setting, the update, and so forth.

Method 200 also includes determining whether the updated BIOS setting matches the active BIOS setting at 280. When the updated BIOS setting matches the active BIOS setting, method 200 may proceed to updating the saved BIOS setting at action 290. The saved BIOS setting may be updated to match the active BIOS setting. This may ensure that changes that have been found to be valid are preserved in the future so they changes do not need to be remade after every boot. When the updated BIOS setting differs from the active BIOS setting, method 200 may proceed to action 290 and take a security action. The security action may include, for example, recovering a prior version of the BIOS setting and booting a system operating the BIOS. In other examples, the security action may include booting the system and alerting an entity of a security event associated with the BIOS.

Figure 3:
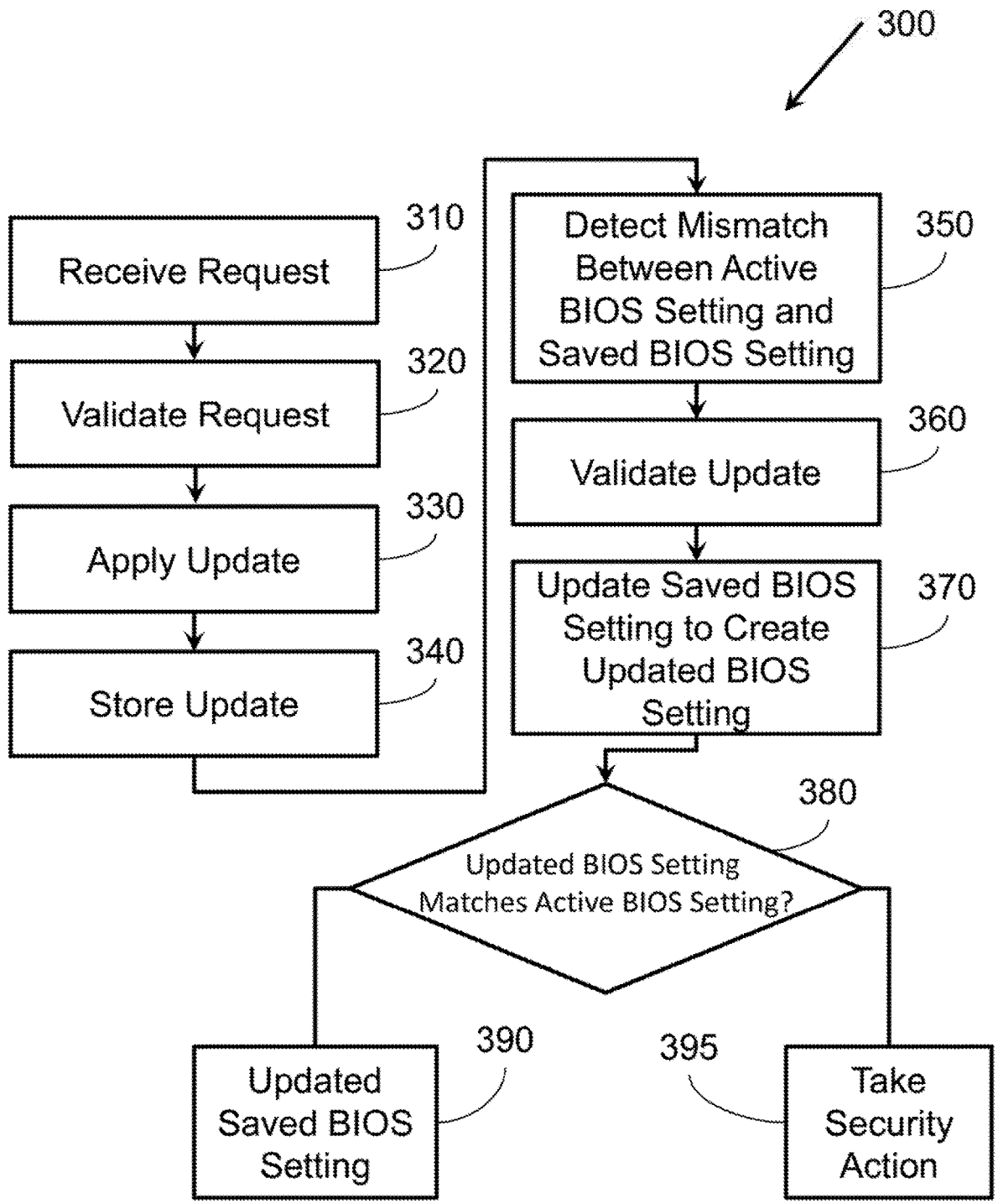
FIG. 3 illustrates another flowchart of example operations associated with BIOS security.

FIG. 3 illustrates a method 300 associated with basic input/output system (BIOS) security. Method 300 includes several actions similar to those described above with reference to method 200 (FIG. 2). For example, method 300 includes detecting a mismatch between an active BIOS setting and a saved BIOS setting at 350, validating an update at 360, updating a saved BIOS setting to create an updated BIOS setting at 370, determining whether the updated BIOS setting matches the active BIOS setting at 380, updating the saved BIOS setting at 390, and taking a security action at 395.

Method 300 also includes receiving a request to update the active BIOS setting at 310. Method 300 also includes validating the request at 320. Method 300 also includes applying the update to the active BIOS setting at 330. Method 300 also includes storing the update at 340. Consequently, method 300 illustrates how valid changes are made to BIOS variables during operation of a system performing method 300.

Figure 4:
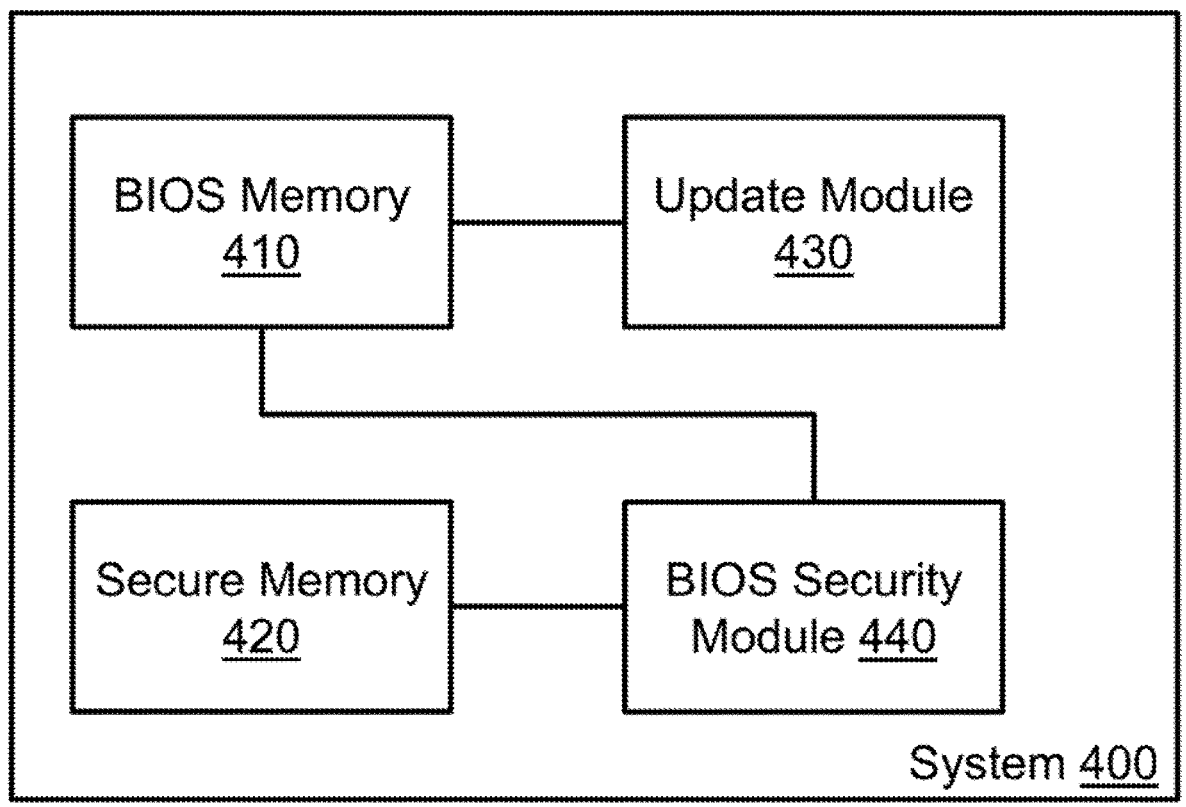
FIG. 4 illustrates an example system associated with BIOS security.

FIG. 4 illustrates a system 400 associated with basic input/output system (BIOS) security. System 400 includes a BIOS memory 410. BIOS memory 410 may store a set of active BIOS variables. BIOS memory 410 may also store a set of saved BIOS variables. The saved BIOS variables may describe a known valid prior version of the set of active BIOS variables. BIOS memory 410 may also store a set of queued updates describing changes made to the set of saved BIOS variables.

System 400 also includes a secure memory 420. Secure memory 420 may store a description of the saved BIOS variables. The description of the saved BIOS variables may be, for example, a copy of the saved BIOS variables, a hash of the saved BIOS variables, and so forth.

System 400 also includes an update module 430. Update module 430 may verify an update to a BIOS variable. Update module 430 may also apply the update to an active BIOS variable. Update module 430 may also store the update in the BIOS memory.

System 400 also includes a BIOS security module 440. BIOS security module may detect a mismatch between a member of the set of active BIOS variables and a respective member of the set of saved BIOS variables. This detection may be performed during a boot of system 400. When the mismatch is detected, the queued updates may be sequentially applied to the set of saved BIOS variables to generate a set of updated BIOS variables. When the set of updated BIOS variables matches the set of active BIOS variables, the saved BIOS variables may be updated to match the set of active BIOS variables. When the set of updated BIOS variables does not match the set of active BIOS variables, a security action may be initiated by BIOS security module 440.

How a mismatch between the member of the set of saved BIOS variables and the member of the set of active BIOS variables is detected may depend on how the description of the set of saved BIOS variables is stored on secure memory 420. Additionally, how the description of the set of saved BIOS variables is stored may also dictate what security actions are possible. For example, the description of the set of saved BIOS variables may be a copy of the set of saved BIOS variables. Consequently, detecting the mismatch may involve comparing each member of the active BIOS variables to a respective member of the copy of the set of saved BIOS variables. Further, because the secure memory includes a backup of the set of saved BIOS variables, the security action may include restoring the saved BIOS variables from the secure memory. However, some systems 400 may not have resources available for storing copies of BIOS variables within secure memory 420. In these cases, the description of the set of saved BIOS variables may include hashes of one or more of the set of saved BIOS variables. In these cases, the security action may involve alerting an entity associated with system 400 of an unauthorized manipulation of a BIOS variable. This entity may be, for example, a user of system 400, a logic tasked with ensuring security of system 400, and so forth.

Figure 5:
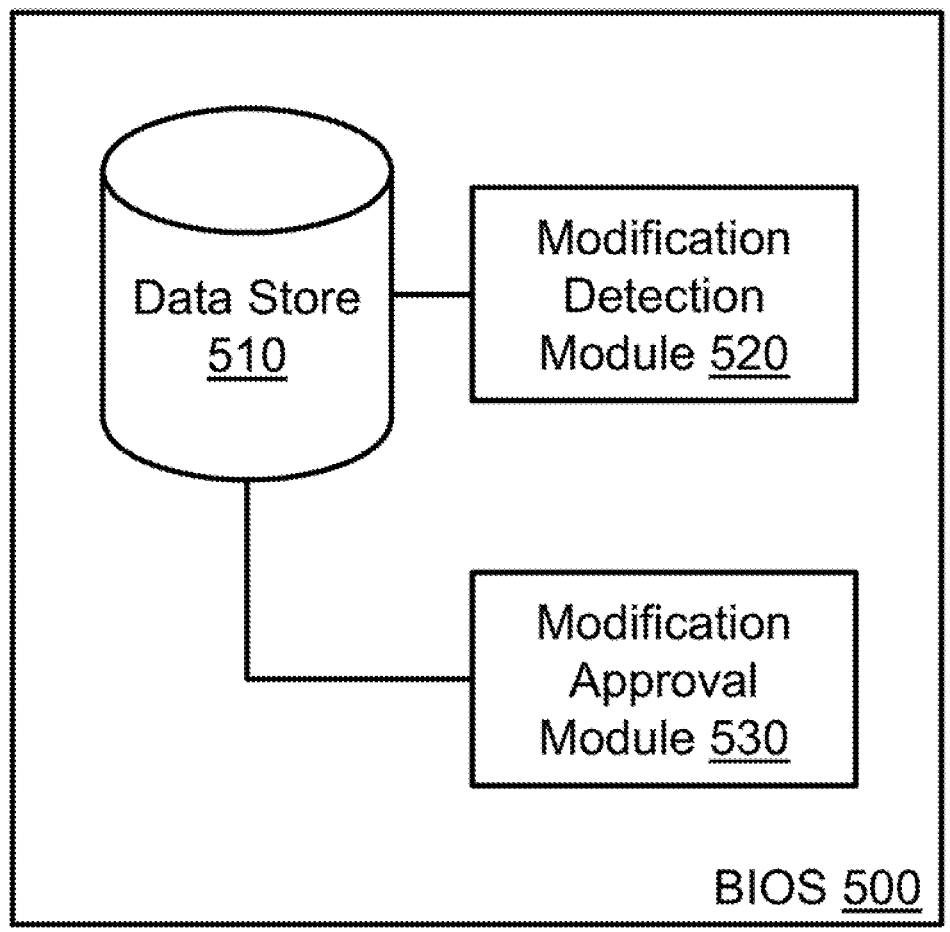
FIG. 5 illustrates an example BIOS.

FIG. 5 illustrates a basic input/output system (BIOS) 500. BIOS 500 may include a data store 510. Data store 510 may store a set of active BIOS variables. Data store 510 may also store a set of saved BIOS variables. The set of saved BIOS variables may describe a known valid prior version of the set of active BIOS variables. Data store 510 may also store a set of queued updates describing changes made to the set of saved BIOS variables.

BIOS 500 also includes a modification detection module 520. Modification detection module 520 may detect a mismatch between a member of the set of active BIOS variables and a respective member of the set of saved BIOS variables. This detection may be performed during a boot of a system operating BIOS 500. The mismatch may be detected by comparing data describing the member of the set of active BIOS variables to data describing the respective member of the set of saved BIOS variables. The data describing the respective member of the set of saved BIOS variables may be retrieved from a secure storage (not shown).

BIOS 500 also includes a modification approval module 530. Modification approval module 530 may apply the set of queued updates to the set of saved BIOS variables. This may generate a set of updated BIOS variables. Modification approval module 530 may also update the set of saved BIOS variables when the set of updated BIOS variables matches the set of active BIOS variables. Modification approval module 530 may also initiate a security action when an updated BIOS variable differs from a respective member of the set of BIOS variables.

In some examples, BIOS 500 may also include a BIOS update module (not shown). The BIOS update module may receive a request to update an updated member of the set of active BIOS settings. The BIOS update module may then validate the request, and, upon successful validation, apply the update to the updated member. The BIOS update module may then store a copy of the update in the BIOS data store.

Figure 6:
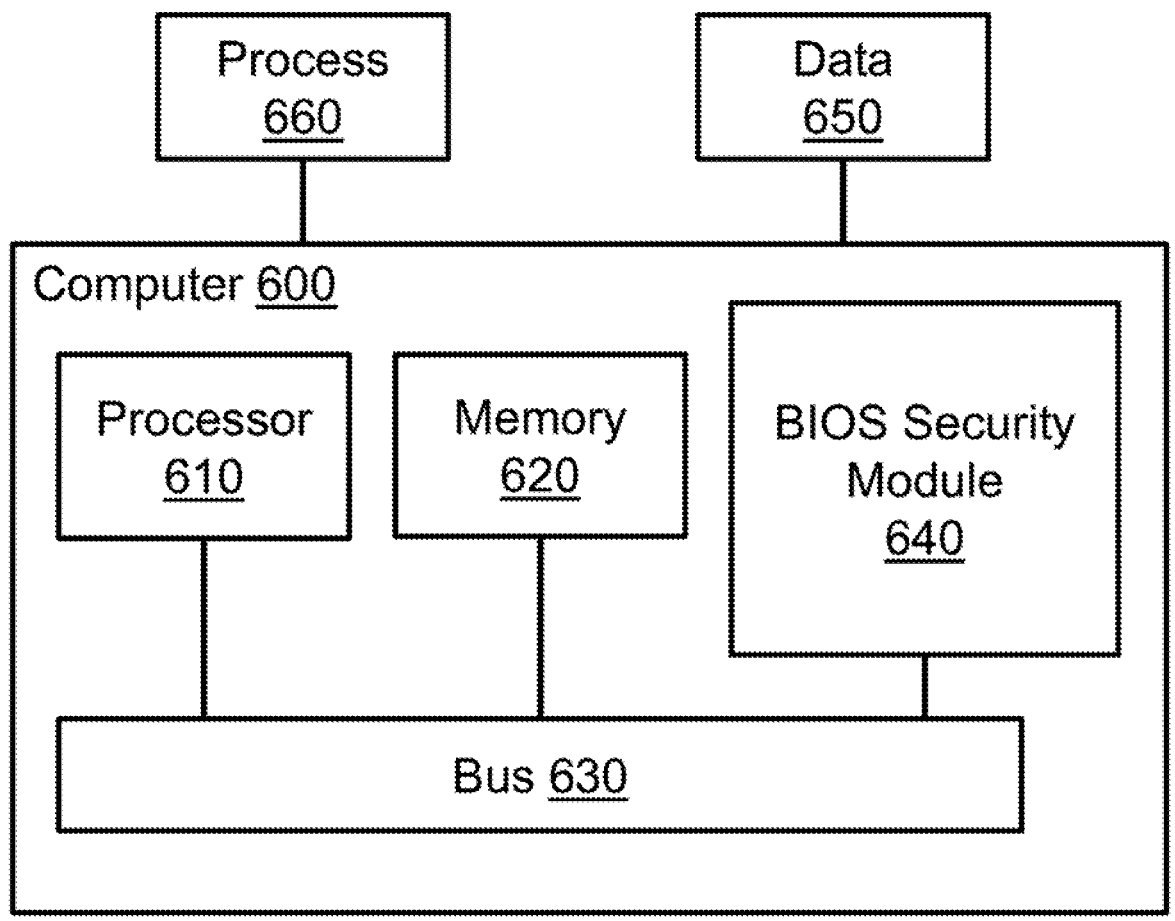
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a BIOS security module 640. BIOS security module 640 may perform, alone or in combination, various functions described above with reference to the example systems, methods, and so forth. In different examples, BIOS security module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
    detecting a mismatch between an active basic input/output system (BIOS) setting and a saved BIOS setting;
    validating an update previously applied to the active BIOS setting;
    applying the update to the saved BIOS setting to create an updated BIOS setting;
    updating the saved BIOS setting when the updated BIOS setting and the active BIOS setting match, where the saved BIOS setting is updated to the active BIOS setting; and
    taking a security action when the updated BIOS setting and the active BIOS setting differ,
    wherein the security action comprises booting a system operating a BIOS corresponding to the active BIOS setting, the saved BIOS setting, and the updated BIOS setting, and alerting an entity of a security event associated with the BIOS,
    wherein detecting the mismatch between the active BIOS setting and the saved BIOS setting includes comparing a hash of the active BIOS setting to a hash of the saved BIOS setting stored on a secure memory.

2. The method of claim 1, comprising
    receiving a request to update the active BIOS setting;
    validating the request;
    applying the update to the active BIOS setting; and
    storing a copy of the update.

3. The method of claim 1, where the BIOS is a unified extensible firmware interface (UEFI) and where the BIOS setting is a UEFI variable.

4. The method of claim 3, where the UEFI variable is a UEFI authenticated variable.

5. The method of claim 1, where detecting the mismatch between the active BIOS setting and the saved BIOS setting includes comparing a hash of a set of active BIOS settings to a hash of a set of saved BIOS settings, where the hash of the set of saved BIOS settings is stored on the secure memory, where the set of active BIOS settings includes the active BIOS setting, and where the set of saved BIOS settings includes the saved BIOS setting.

6. The method of claim 1, comprising taking another security action when the updated BIOS setting and the active BIOS setting differ, wherein the another security action comprises recovering a prior version of the BIOS setting and booting a system operating the BIOS.

7. A system, comprising:
    a basic input/output system (BIOS) memory to store a set of active BIOS variables, a set of saved BIOS variables that describe a known valid prior version of the set of active BIOS variables, and a set of queued updates describing changes made to the set of saved BIOS variables;

a secure memory to store a description of the set of saved BIOS variables;

an update module to verify an update to a BIOS variable, apply the update to an active BIOS variable, and store the update in the BIOS memory; and a BIOS security module to detect, during a boot of the system, a mismatch between a member of the set of active BIOS variables and a respective member of the set of saved BIOS variables, to apply the queued updates to the set of saved BIOS variables to generate a set of updated BIOS variables, to update the saved BIOS variables and the description of the set of saved BIOS variables when the set of updated BIOS variables matches the set of active BIOS variables, and to initiate a security action when an updated BIOS variable differs from a respective member of the set of active BIOS variables, wherein the security action involves restoring the saved BIOS variables to a known prior safe version of BIOS variables, wherein, to detect the mismatch between the member of the set of active BIOS variables and the respective member of the set of saved BIOS variables, the BIOS security module is to compare a hash of the member of the set of active BIOS variables to a hash of the respective member of the set of saved BIOS variables stored on the secure memory.

8. The system of claim 7, where the description of the set of saved BIOS variables is a hash of the set of saved BIOS variables.

9. The system of claim 8, wherein the BIOS security module is to perform another security action, wherein the another security action involves alerting an entity associated with the system of an unauthorized manipulation of a BIOS variable.

10. The system of claim 7, where the description of the set of saved BIOS variables is a copy of the set of saved BIOS variables.

11. A basic input/output system (BIOS), comprising:

a data store to store a set of active BIOS variables, a set of saved BIOS variables that describe a known valid prior version of the set of active BIOS variables, and a set of queued updates describing changes made to the set of saved BIOS variables;

a modification detection module to detect, during a boot of a system operating the BIOS, a mismatch between a member of the set of active BIOS variables and a respective member of the set of saved BIOS variables; and a modification approval module to apply the set of queued updates to the set of saved BIOS variables to generate a set of updated BIOS variables, to update the saved BIOS variables when the set of updated BIOS variables matches the set of active BIOS variables, and to initiate a security action when an updated BIOS variable differs from a respective member of the set of active BIOS variables, wherein the security action involves restoration of the set of saved BIOS variables to a known prior safe version of BIOS variables, wherein, to detect the mismatch between the member of the set of active BIOS variables and the respective member of the set of saved BIOS variables, the modification detection module is to compare a hash of the member of the set of active BIOS variables to a hash of the respective member of the set of saved BIOS variables stored on a secure storage.

12. The BIOS of claim 11, comprising a BIOS update module to receive a request to update an updated member of the set of active BIOS settings, to validate the request, to apply the update to the updated member, and to store a copy of the update in the BIOS data store.

13. The BIOS of claim 11, wherein, to detect the mismatch, the modification detection module is to compare data describing the member of the set of active BIOS variables to data describing the respective member of the set of saved BIOS variables, where the data describing the respective member of the set of saved BIOS variables is retrieved from the secure storage.

* * * * *